United States Patent
Schittl et al.

(10) Patent No.: US 6,361,238 B1
(45) Date of Patent: Mar. 26, 2002

(54) ATTACHMENT ELEMENT FOR SECURING A RAIL FOOT

(75) Inventors: Josef Schittl, Thüringen; Markus Gmeiner, Feldkirch; Eduard Sever, Bludenz, all of (AT)

(73) Assignee: Hilti Aktiengesellschaft, Schaan ( * ) Notice: Subject to any disclaimer, the term of this patent is extended or adjusted under 35 U.S.C. 154(b) by 0 days.

(21) Appl. No.: 09/533,475

(22) Filed: Mar. 23, 2000

(30) Foreign Application Priority Data

May 7, 1999 (DE) .......................................... 199 21 148

(51) Int. Cl.[7] .............................................. F16C 11/00
(52) U.S. Cl. .......................... 403/122; 403/142; 403/90; 248/288.31
(58) Field of Search ....................... 248/288.31, 288.51, 248/181.1; 403/143, 142, 141, 122, 90, 131, 128

(56) References Cited

U.S. PATENT DOCUMENTS

| | | | |
|---|---|---|---|
| 2,664,029 A | * 12/1953 | Higgins | ........................ 403/90 |
| 4,118,009 A | * 10/1978 | Chmura | ................. 251/315.04 |
| 4,515,336 A | 5/1985 | Fischer | |
| 4,796,508 A | 1/1989 | Hoshino | |
| 5,803,642 A | * 9/1998 | Sassmannshausen | ......... 403/90 |
| 5,899,167 A | * 5/1999 | Furman | ...................... 403/143 |

FOREIGN PATENT DOCUMENTS

| | | | |
|---|---|---|---|
| DE | 2112431 | 10/1971 | |
| DE | 9301268 | 4/1993 | |
| DE | 4333913 A1 | * 4/1994 | ................. 403/122 |
| FR | 2548746 | 1/1985 | |
| WO | 9014031 | 11/1990 | |

OTHER PUBLICATIONS

Search Report, Oct. 4, 2000.

* cited by examiner

Primary Examiner—Lynne H. Browne
Assistant Examiner—Aaron M Dunwoody
(74) Attorney, Agent, or Firm—Sidley Austin Brown & Wood, LLP

(57) ABSTRACT

An attachment element, including a base (1) having a bearing surface (14), a clamping member (3), and a ball (4) extending through a through-bore formed in the clamping member (3) an axis of which extends transverse to the bearing surface (14), with the ball (4) having a connection member (5) and a counter-support (88), and with the connection member (5) being rotatable relative to the ball (4) and having, at a region thereof adjacent to the base (1), a bearing element (7) projecting into the counter-support (8).

5 Claims, 2 Drawing Sheets

ATTACHMENT ELEMENT FOR SECURING A RAIL FOOT

BACKGROUND OF THE INVENTION

1. Field of the Invention

The present invention relates to an attachment element for securing a foot, e.g., of a guide rail and including a base having a bearing surface, a clamping member, and a ball which extends through a through-bore formed in the clamping member and an axis of which extends transverse to the bearing surface of the base, and has a connection member.

2. Description of the Prior Art

German Publication DE-33 44 064 discloses an attachment element having a base, a clamping member, a ball, and a connection member connected with the ball. The base lies on a base plate and is secured thereto with two screws. The base plate itself lies on an upper surface of a component. At each of its sides, which lie opposite the bearing surface, the base plate has a projection having a semi-spherical receiving opening an outer thread provided on its outer profile. The outer thread of the projection formlockingly cooperates with an inner thread provided in the clamping member. The clamping member has a disc-shaped bearing element the through-bore of which has a geometry corresponding to the outer profile of the ball. The ball is received in a receiving opening of the base and is fixedly secured by the bearing element upon rotation of the clamping member relative to the base.

A connection member projects from the ball in a direction remote from the bearing surface of the base. The connection member is formed as a threaded bolt projecting into a corresponding threaded opening in the end surface of a guide rail.

With the attachment element disclosed in DE-33 44 064, rotation of the guide rail in a plane that extends parallel to or is inclined relative to a plane, in which the bearing surface of the base is located, is only then possible when the clamping connection between the ball, the base, and the clamping member is broken. In this case, the ball can be freely rotated or pivoted relative to the base and/or clamping member.

Accordingly, an object of the present invention is to provide an attachment element with which a guide rail securable on the connection member can pivot in a plane, which extends parallel to or at angle to a plane in which the bearing surface of the base extends, without loosing the previously established alignment or inclination of the connection member with respect to the bearing surface of the base.

SUMMARY OF THE INVENTION

This and other objects of the present invention, which become apparent hereinafter, are achieved by providing an attachment element including a base having a bearing surface, a clamping member, and a ball extending through a through-bore formed in the clamping member an axis of which extends transverse to the bearing surface. The ball has a connection member and a counter-support. The connection member is adapted to rotate relative to the ball and has at its region adjacent to the base, a bearing element projecting into the counter-support.

The present invention insures that, on one hand, the ball with the connection member can be fixedly secured and, on the other hand, the connection member, despite the ball being secured, can rotate relative to the ball. In this way, it is achieved that the guide rail, which is connected with the connection member, can pivot in a plane that extends parallel to or at an angle to a plane formed by the base bearing surface, without the connection between the ball, the clamping member, and the base being broken.

For manufacturing reasons, advantageously, the bearing element is formed as a substantially cylindrical section, and the counter-support is formed as a substantially cylindrical bore.

In order to provide for rapid connection between the connection member and, e.g., a guide rail, the connection member can be provided, at its end opposite the bearing element, with an eccentric the eccentric cross-sectional surface of which extends transverse to the axis of the bearing element.

In order to be able to achieve a clamping connection between the eccentric and, e.g., a guide rail with a small force, preferably, the connection member is provided with a sidewise projecting pivot lever which is fixedly connected with the connection member and has one of its end arranged between the bearing element and the eccentric.

In order to be able to lock the eccentric to a structural part, in particular, a guide rail, and/or constructional component advantageously, the free end of the lever is bent in a direction away from the base and parallel to the axis of the bearing element. The free end is provided with a locking profile formlockingly cooperating with the constructional component or the guide rail. In order to be able to achieve a resilient behavior of the pivot lever which is important for formlockingly connecting the free bent-out end of the lever with the constructional component or the guide rail upon locking of the eccentric, advantageously, the free end of the pivot lever projects beyond the outer profile of the base.

For a perpendicular alignment of the bearing support relative a plane formed by the bearing surface of the base, preferably the ball has, in a plane that extends perpendicular to an axis of the counter support and in which a ball diameter is largest, a groove formed in an outer profile of the ball and in which a pivot axle of the base which is arranged substantially tangentially to the groove, is displaceable. The pivot axle, in this way, insures fixing of the ball with respect to the base and the clamping member.

The region of the pivot axle, which projects into the groove, has a side recess. Upon rotation of the axle, the recess become aligned with the groove, and the axle does not project any more into the groove. In this way, the ball ban be pivoted into a position in which the axis of the counter-support does not extend any more perpendicular to the plane formed by bearing surfaces.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
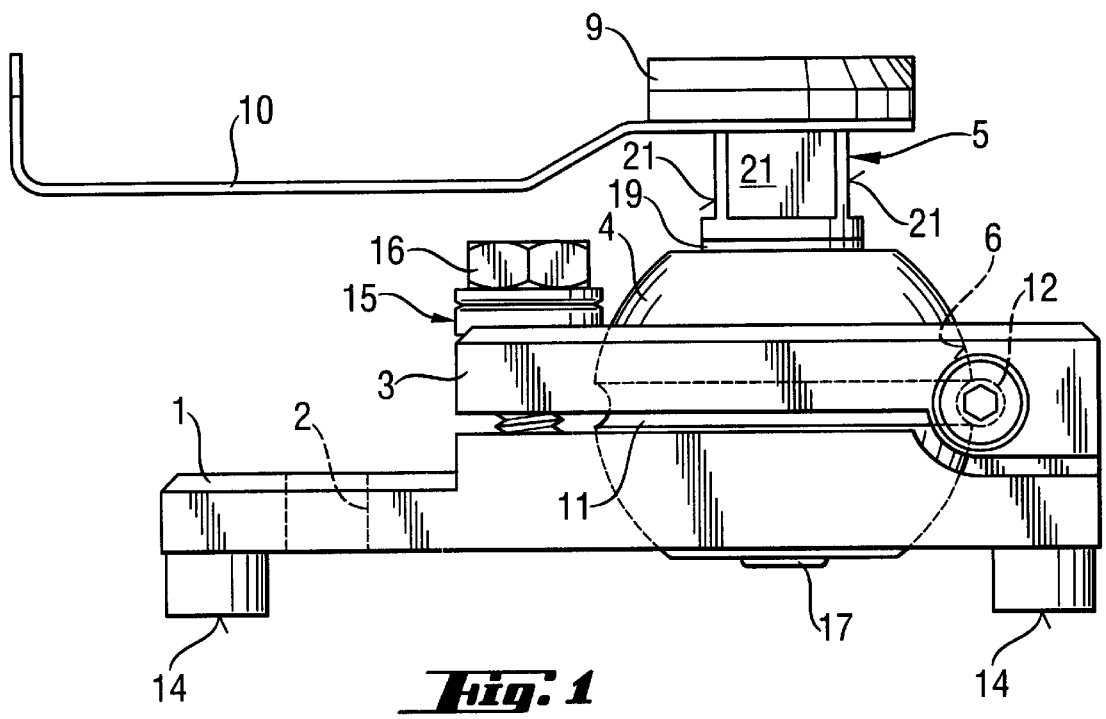
FIG. 1 a side view of an attachment element according to the present invention.
Figure 2:
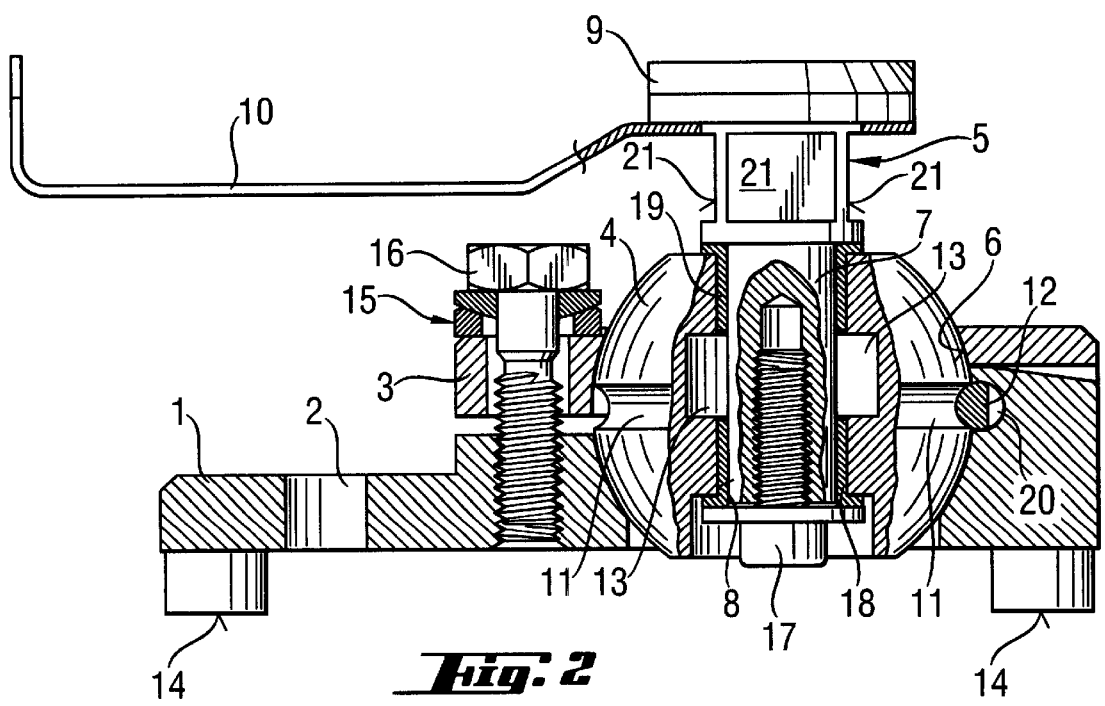
FIG. 2 a cross-sectional view of the attachment element shown in FIG. 1 along line II—II.
Figure 3:
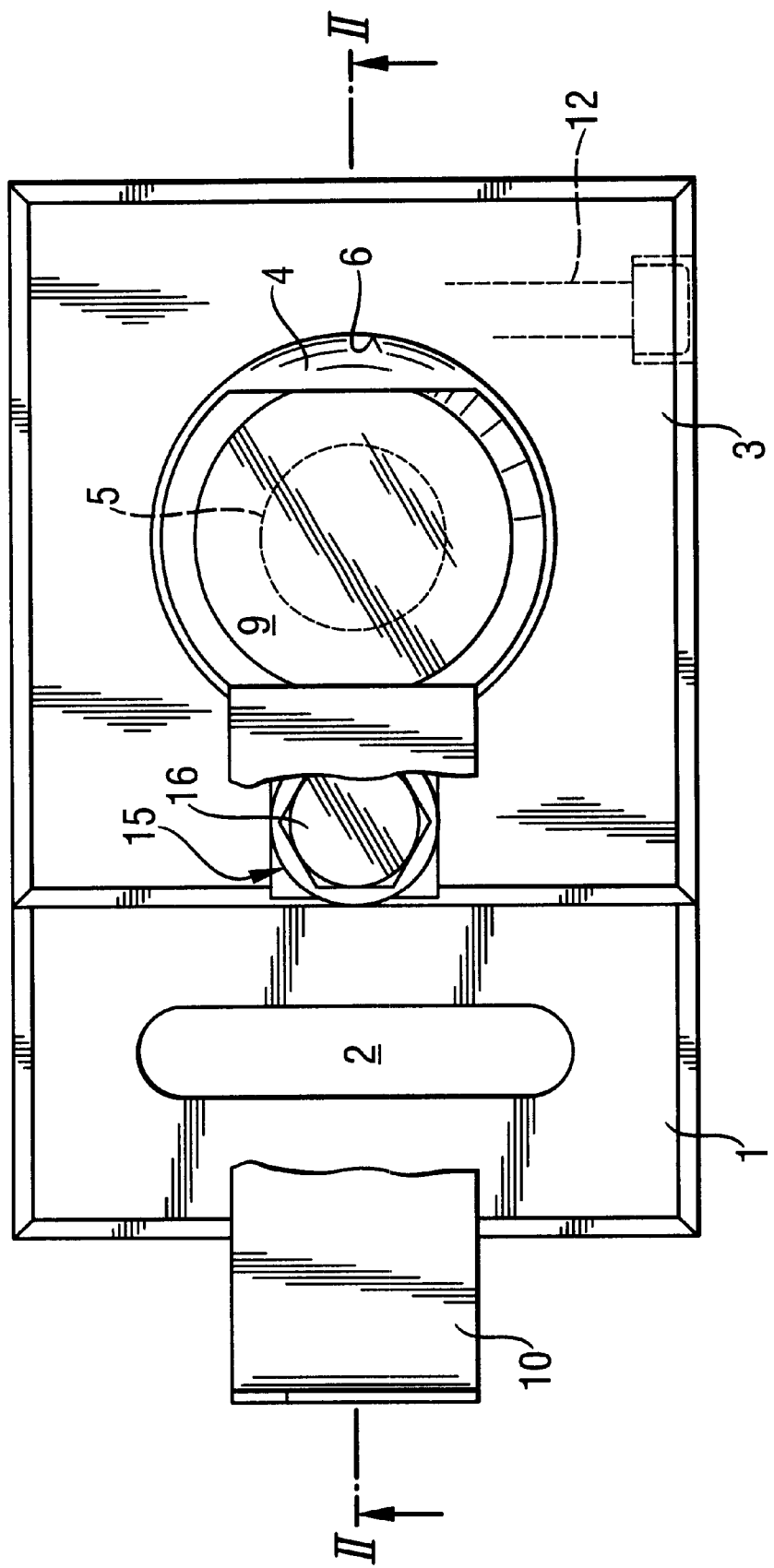
FIG. 3 a plan view of the attachment element shown in FIG. 1.

An attachment element according to the present invention, which is shown in FIGS. 1–3, serves for securing of guide rails (not shown) to an outer surface of a constructional component which is treated with a tool (likewise not shown) displaceable along the guide rail.

The inventive attachment element has a base 1 with a plurality of support members having a bearing surface 14. The base 1 can have, e.g., four support members. The base 1 can also have only three support members, forming a so-called three-point support. For securing the attachment element to the outer surface of the constructional component an attachment screw (not shown) can be used. The screw would extend through a hole 2 formed in the base 1 and would be screwed in a receiving bore formed in the constructional component.

On the side of the base 1 opposite the bearing surfaces 14, there is provided a substantially semi-spherical receiving opening 6 which narrows in a direction toward the bearing surfaces 14 and in which a ball 4 is received. A clamping member 3, which cooperates with the base 1, serves for clamping the ball 4 between the base 1 and the clamping member 3. Like the base 1, the clamping member also has a semi-spherical receiving opening that narrows in a direction away from the bearing surfaces 14. A rotational axle 12 pivotally connects the base 1 and the clamping member 3. The axis of the axle 12 extends parallel to the bearing surfaces 14. The exact position of the axle 12 will be described in more detail below.

A screw 16, which extends through the clamping member 3 and is screwed in a receiving bore formed in the base 1 and having a matching thread, permits to eliminate clearance between the semi-spherical openings of the base 1 and the clamping member 3 and the outer surface of the ball 4, clamping the ball 4 between the base 1 and the clamping member 3.

A compensation member 15, which is formed of two discs, is arranged between the head of the screw 16 and a surface of the clamping member 3 remote from the bearing surfaces 14. The compensation member 15 only then insures a good support of the head of the screw 16 against the clamping member 3 when the clamping member 3 is inclined with respect to a plane formed by the bearing surfaces 14.

The ball 4 has a counter-support surface 8 in a form of a through-bore that widens step-wise in the direction toward the bearing surfaces 14. From two opposite sides, bearing bushes 18, 19, which are provided each with a flange-like band, project in respective portions of the through-bore having a smaller diameter. Between the two bearing bushes 18, 19, which are spaced from each other, the through-bore has a radial widening in a form of an undercut 13. The bearing bushes 18, 19 serve or supporting a connection member 5 the bearing element 7 of which extends through both bearing bushes 18, 19, with the free end of the bearing element 7 and the step-shaped transition of the through-bore 8 lying in the same plane.

Starting from the free end of the bearing element 7, a threaded bore extends into the connection member 4 into which a screw 17 is threaded in. The head of the screw 17 is supported by means of a washer against a circular bearing surface which is formed by a surface of the step-shaped transition of the through-bore that lies adjacent to the bearing surfaces 14. The outer diameter of the bearing element 7 corresponds to the inner diameter of the bearing bushes 18, 19. The outer diameter of the bearing bushes 18, 19 corresponds to the smaller diameter of the through-bore formed in the ball 4.

An eccentric 9 is arranged at a free end region of the connection member 5 opposite the bearing element 7. The eccentric cross-sectional surface of the eccentric 9 lies in a plane extending perpendicular to the central axis of the bearing element 7. The eccentric 9 has two spaced, straight side surfaces extending parallel to each other and parallel to the central axis of the bearing element 7.

A pivot lever 10 is attached to the eccentric 9. The lever 10 has a free end portion bent at an angle of 90° in a direction away from the bearing surfaces 14. The bent-out free end portion of the lever 10 is provided with a locking profile (not shown in detail) which cooperates formlockingly with the guide rail and which insures that the eccentric 9 can be locked in the guide rail in a clamped position. Wrench flats 21 are provided adjacent to the lever 10. The wrench flats 21 provides for rotation of the connection member 5 with a suitable wrench.

The ball 4 has, in a plane, which extends transverse to the axis of the counter-support 8 and in which the ball diameter is largest, a circumferential outer groove 11.

A pivot axle 12, which pivotally connects the base 1 and the clamping member 3, extends substantially tangentially to the groove 11 and parallel to the bearing surfaces 14. The axle 12 extends through both the base 1 and the clamping member 3 and projects sidewise into the groove 11. The cooperation between the axle 12 and the groove 11 insures that the counter-support 8 always remains in a position perpendicular to the plane formed by the bearing surfaces 14 even when the connection member 5 is rotated relative to the ball 4.

The region of the pivot axle 12, which projects into the groove 11, has a side recess 20. Upon rotation of the axle 12, the recess 20 becomes aligned with the groove 11, and the axle 12 does not project any more into the groove 11. In this way, the ball 4 can be pivoted into a position in which the axis of the counter-support 8 does not extend any more perpendicular to the plane formed by bearing surfaces 14.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An attachment element, comprising a base (1) having a bearing surface (14); a clamping member (3); and a ball (4) extending through a through-bore formed in the clamping member (3) an axis of which extends transverse to the bearing surface (14), the ball (4) having a connection member (5) and a counter-support (8), the connection member (5) being rotatable relative to the ball (4) and having, at a first region thereof adjacent to the base (1), a bearing element (7) projecting into the counter-support (8), wherein the connection member (5) has, at an end region thereof opposite the bearing element (7), a cross-sectional surface of which extends transverse to the axis of the bearing element (7), and wherein the connection member (5) has a sidewise projecting pivot lever (10) fixedly connected therewith and arranged between the bearing element (7) and the eccentric (9).

2. An attachment element according to claim 1, wherein the bearing element (7) is formed by a substantially cylindrical section, and the counter-support is formed by a substantially cylindrical bore.

3. An attachment element according to claim 1 wherein the pivot lever (10) has a free end bend in a direction remote from base (1) and parallel to the axis of the bearing element (7).

4. An attachment element according to claim 3, wherein the free end of the pivot lever (10) projects beyond an outer profile of the base (1).

5. An attachment element according to claim 3, wherein the ball (4) has, in a plane that extends perpendicular to an axis of the counter support (8) and in which a ball diameter is largest, a groove (11) formed in an outer profile of the ball and in which a pivot axle (12) of the base (1), which is arranged substantially tangentially to the groove (11), is displaceable.

\* \* \* \* \*